though Patent Office 3,347,862
Patented Oct. 17, 1967

3,347,862
PIPERAZINE 2,6-DIIODO-4-NITROPHENYL
PHOSPHATE
Samuel S. M. Wang, Indianapolis, Ind., assignor to The Dow Chemical Company, Midland, Mich., a corporation of Delaware
No Drawing. Filed Feb. 7, 1966, Ser. No. 525,373
1 Claim. (Cl. 260—268)

The present invention is directed to the piperazine 2,6-diiodo-4-nitrophenyl phosphate corresponding to the formula

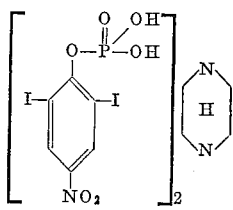

The compound of the present invention is a crystalline solid melting with decomposition at 239°–240° C. This compound is slightly soluble in water and in glycerine and is insoluble in organic solvents such as ether and petroleum ether. The compound of the present invention has been found to be useful as an anthelmintic and is particularly effective in combating hookworm (*Ancyclostoma canium*) in such domestic animals as dogs or sheep.

The new compound of the present invention is prepared by reacting together piperazine and the 2,6-diiodo-4-nitrophenyl phosphate in the presence of water. The reaction is conveniently carried out in the presence of acetone-water, and ethanol-water mixtures as reaction media. The reaction proceeds readily with the production of the desired product at temperatures of from 5° to 40° C. and particularly at temperatures from 20° to 30° C. The proportions of the starting materials are not critical, some of the desired product being formed upon contacting the reactants in any proportions. However, the reaction consumes two molecular proportions of the 2,6-diiodo-4-nitrophenyl phosphate for each molecular proportion of piperazine and the use of the reactants in such proportions is preferred.

In carrying out the preparation of the piperazine 2,6-diiodo-4-nitrophenyl phosphate, the piperazine and 2,6-diiodo-4-nitrophenyl phosphate are contacted together in any order or fashion. In a convenient procedure, the reactants are contacted in the presence of water as reaction medium. Following the contacting of the reactants the reaction mixture is maintained at a temperature within the desired temperature range for a short period of time. Thereafter the reaction mixture is made acidic to a pH of about 4–6, by the addition of small amounts of a mineral acid, preferably hydrochloric acid. Upon the addition of the acid to the reaction mixture the desired product precipitates as a crystalline solid. This crystalline solid is then isolated by such conventional procedures as decantation or centrifugation, or filtration. The product obtained by such procedures can be employed in anthelminic compositions or further purified by such procedures as washing or recrystallization.

The following examples are merely illustrative and are not intended to be limiting.

*Example 1*

A solution of piperazine (0.12 gram; 0.0012 mole) in 5 milliliters of water was added with stirring to a solution of 2,6-diiodo-4-nitrophenyl phosphate (0.474 gram; 0.001 mole) in 20 milliliters of water. Following the contacting of the reactants 1 percent hydrochloric acid was slowly added to the reaction mixture until the piperazine 2,6-diiodo-4-nitrophenyl phosphate product began to precipitate. Thereafter, the precipitated product was isolated by filtration, and washed with water and alcohol and thereafter dried. The piperazine 2,6-diiodo-4-nitrophenyl phosphate product melted with decomposition at 239°–240° C.

The compound of the present application can be employed as the sole toxicant in anthelmintic compositions. Said compound can be administered orally or intragastrically. In such uses, the piperazine 2,6-diiodo-4-nitrophenyl phosphate compound can be administered in the form of capsules, tablets, boluses or dispersed in animal feed compositions. Such compositions are generally given as a single dose or at frequent intervals over a short period. A single dose of from 20 to 50 mg. of the piperazine salt of 2,6-diido-4-nitrophenyl phosphate per kilogram of animal body weight gives good control of *Ancyclostoma canium*. Administration of a single dose of the compound at these levels is normally an adequate therapeutic treatment. Additional treatments over a period of time may be employed when indicated for control of reinfection.

In such uses, the toxic compound can be employed singly or intimately dispersed or dissolved in diluents or carriers. The toxic compound can be blended or mixed with innocuous, orally ingestable nutrient diluents, fillers, binders, lubricants, suspending agents and like excipients by conventional formulating techniques.

In representative operations dogs known from fecal examinations to be infected with hookworms (*Ancyclostoma canium*) were administered a single dose of piperazine 2,6-diiodo-4-nitrophenyl phosphate in a hard gelatin capsule containing an amount equivalent to 25 milligrams per kilogram of body weight of the dog. Upon necropsy of the dogs five days after the administration of the toxicant compounds no live hookworms are found.

I claim:
Piperazine 2,6-diiodo-4-nitrophenyl phosphate.

References Cited

UNITED STATES PATENTS 3,081,224  3/1963  Thorson et al. _____ 167—53

HENRY R. JILES, *Primary Examiner.*